United States Patent
Halligan (10) Patent No.: US 11,366,827 B2
(45) Date of Patent: Jun. 21, 2022

(54) DATA REPLICATION

(71) Applicant: Openwave Mobility Inc., Redwood City, CA (US)

(72) Inventor: Matt Halligan, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 226 days.

(21) Appl. No.: 16/365,545

(22) Filed: Mar. 26, 2019

(65) Prior Publication Data
US 2019/0303386 A1 Oct. 3, 2019

(30) Foreign Application Priority Data

Mar. 27, 2018 (GB) ...................................... 1804925

(51) Int. Cl.
*G06F 16/27* (2019.01)
*H04W 8/20* (2009.01)
(Continued)

(52) U.S. Cl.
CPC ............ *G06F 16/27* (2019.01); *G06F 16/273* (2019.01); *H04L 67/1095* (2013.01);
(Continued)

(58) Field of Classification Search
CPC ........ G06F 16/27; G06F 16/273; G06F 16/10; H04W 8/20; H04W 8/00; H04W 24/04;
(Continued)

(56) References Cited

U.S. PATENT DOCUMENTS

| 8,849,758 B1 * | 9/2014 | Sivasubramanian ... G06F 16/27 707/636 |
| 10,592,478 B1 * | 3/2020 | Danilov .................. G06F 16/27 |

(Continued)

FOREIGN PATENT DOCUMENTS

| WO | 2012012334 A1 | 1/2012 |
| WO | 2012126535 A1 | 9/2012 |

OTHER PUBLICATIONS

Combined Search and Examination Report dated Aug. 31, 2018 for GB1804925.4.
(Continued)

*Primary Examiner* — Michael Pham
(74) *Attorney, Agent, or Firm* — EIP US LLP (57) ABSTRACT

A method of data replication in a distributed storage system of a mobile communications network is disclosed. The distributed storage system comprises a plurality of geographically separated storage locations. The method comprises, at a first storage location: receiving a first request for data stored in the distributed storage system; determining, based on the first request, further, different, data to be stored at the first storage location; determining a second, different, storage location, of the plurality of storage locations, at which the determined further data is stored; sending, to the determined second storage location, a replication request for replicating the determined further data; receiving, in response to the replication request, the further data; and storing the further data such that the further data is replicated at the first storage location in advance of a further request for the further data being received at the first storage location. Apparatus is also disclosed.

18 Claims, 4 Drawing Sheets

(51) Int. Cl.
*H04L 67/1097* (2022.01)
*H04L 67/1095* (2022.01)
*H04W 8/00* (2009.01)

(52) U.S. Cl.
CPC ........... *H04L 67/1097* (2013.01); *H04W 8/00* (2013.01); *H04W 8/20* (2013.01)

(58) Field of Classification Search
CPC ... H04W 8/30; H04L 67/1097; H04L 67/1095
USPC .................................................. 707/620, 610
See application file for complete search history.

(56) References Cited

U.S. PATENT DOCUMENTS

| | | | | |
|---|---|---|---|---|
| 2009/0070337 | A1* | 3/2009 | Romem | G06F 16/27 |
| 2011/0196828 | A1* | 8/2011 | Drobychev | G06F 16/275 |
| | | | | 707/622 |
| 2014/0095457 | A1* | 4/2014 | Quan | H04L 67/2842 |
| | | | | 707/697 |
| 2016/0226971 | A1* | 8/2016 | Barajas Gonzalez | ........................ |
| | | | | H04L 67/1095 |
| 2016/0286043 | A1 | 9/2016 | John et al. | |
| 2018/0013884 | A1 | 1/2018 | John et al. | |

OTHER PUBLICATIONS

Kumar, Sanjay: "A Replication Control Protocol for Distributed Databases", Chapter II, Literature Review, 2014, Sam Higginbottom Institute of Agriculture, Technology and Sciences, Department of Computer Science and IT.

Examination Report dated Jun. 29, 2020 for GB Application No. GB1804925.4.

\* cited by examiner

| Subscriber | Data A Loc. | Data B Loc. | Data C Loc. | Data D Loc. | Data E Loc. |
|---|---|---|---|---|---|
| Sub X | SDM 2b | SDM 2b | SDM 2b | SDM 3b | SDM 3b |
| Sub Y | SDM 1b | SDM 1b | SDM1b | SDM1b | SDM1b |

| Sequence number | Request Source | Data Requested |
|---|---|---|
| 1 | APP 1f | A |
| 2 | APP 1g | B, C |
| 3 | APP 1h | D, E |

DATA REPLICATION

CROSS-REFERENCE TO RELATED APPLICATIONS

This application claims priority to GB Application No. GB1804925.4, filed Mar. 27, 2018, under 35 U.S.C. § 119(a). Each of the above-referenced patent applications is incorporated by reference in its entirety.

BACKGROUND OF THE INVENTION

Field of the Invention

The present invention relates to data replication, and more specifically to data replication in a distributed storage system of a mobile communications network.

Description of the Related Technology

Mobile communications network operators store data relating to subscribers of the network, such as subscription data, policy data and application data, in a repository. A mobile communications network, (e.g. an LTE (Long-term Evolution) or 5G (e.g. 3GPP release 15) network, comprises a UDR (Unified or Universal Data Repository) in which the subscriber data is stored. Network elements or functions of the network may have access to or make requests for data stored in the UDR. For example, an MME (Mobility Management Entity) or AMF (Access and Mobility Management Function) of a network may authenticate subscribers and select the appropriate gateway during the initial registration process for a UE (User Equipment) of a subscriber, using subscription data maintained in the UDR. As another example, a PCRF (Policy and Charging Rules Function) or PCF (Policy Control Function) of the network may make policy decisions for subscribers active on the network, for example relating to QoS (Quality of Service) levels and charging rules, using policy data for the subscriber maintained at the UDR. There can be multiple UDRs deployed in a network. It can be important for network latency considerations that subscriber data is readily available to network elements or functions across the network, including at the network edge, which can be problematic in centralised storage systems.

Distributed storage systems or databases store data at geographically separated locations or instances. Such distributed storage systems can make the stored data available at each of the geographically separated locations. Data replication is employed in such distributed storage systems to produce consistent replicas of the stored data at each instance. Typically, data replication employs a master/slave model in which a master logs updates which are then sent to each of the slaves so that all instances store identical replicas. Optimistic replication allows for divergence in the replicas at each instance, which are made to converge eventually by a reconciliation process. For relatively large data sets however, such replication can demand relatively large storage provisions at each instance, which can be expensive, as well as place a high demand on communication links between the resources.

It is an object of the present invention to mitigate at least some of the deficiencies of the prior art.

SUMMARY

According to a first aspect of the present invention, there is provided a method of data replication in a distributed storage system of a mobile communications network, the distributed storage system comprising a plurality of geographically separated storage locations, the method comprising, at a first storage location of the plurality of geographically separated storage locations: receiving one or more first requests for data stored in the distributed storage system; determining, based on the one or more first requests, further data to be stored at the first storage location, the further data being different to the data requested in the one or more first requests; determining a second storage location, of the plurality of storage locations, at which the determined further data is stored, the second storage location being different to the first storage location; sending, to the determined second storage location, a replication request for replicating the determined further data at the first storage location; receiving, in response to the replication request, the further data; and storing the further data such that the further data is replicated at the first storage location in advance of one or more further requests for the further data being received at the first storage location.

The determining the further data to be stored at the first storage location may comprise: identifying a predefined access pattern with which the one or more first requests are associated; and determining the further data to be stored at the first storage location based on the identified predefined access pattern.

The identifying the predefined access pattern with which the one or more first requests are associated may comprise: determining one or more characteristics of the one or more of the first requests; and identifying the predefined access pattern on the basis of the determined one or more characteristics of the one or more first requests.

The one or more characteristics may comprise one or more request sources from which one or more of the first requests is received; and/or one or more sets of data that are requested in one or more of the first requests; and/or one or more entries of the distributed storage system to which one or more of the first request relates.

The identifying the predefined access pattern with which the one or more first requests are associated may comprise: selecting the predefined access pattern with which the one or more first requests are associated from a plurality of said predefined access patterns.

The identified predefined access pattern may comprise information related to the one or more further requests for data stored in the distributed storage system to be received by the first storage location, and the further data to be stored at the first storage location may be determined based on the information related to the one or more further requests.

The information related to the one or more further request may comprise information identifying one or more applications that are to send the one or more further requests for data stored in the distributed storage system to the first storage location.

The method may comprise: determining the predefined access pattern.

The determining the predefined access pattern may comprise: monitoring requests received at one of the plurality of storage locations; applying a pattern recognition process to the monitored requests, thereby to identify a pattern in the monitored requests; and determining the predefined access pattern based on the identified pattern.

The pattern recognition process may comprise: determining that a given sequence of the monitored requests is received at one of the plurality of storage locations more than a predefined number of times.

The pattern recognition process may comprise: determining that the given sequence of the monitored requests is received at one of the plurality of storage locations more than the predefined number of times within a predefined time period.

The requests of the given sequence of requests may each be associated with the same distinguished entry of the distributed storage system.

The data requested in one or more of the first requests, and the further data to be stored at the first storage location, may be from the same distinguished entry of the distributed storage system.

The distinguished entry may be an entry for a given subscriber of the mobile communications network.

The method may comprise: interrogating a data replication map, the data replication map mapping data stored by the distributed storage system to one or more of the plurality of storage locations at which the data is stored; and the determining the second storage location at which the determined further data is stored may be based on the interrogating.

The method may comprise: responsive to the storing of the further data at the first storage location such that the further data is replicated at the first storage location, updating the data replication map such that the updated data replication map maps the further data to the first storage location.

The method may comprise: removing the further data from the second storage location; or moving the further data from the second storage location to a further one of the plurality of storage locations.

The removing the further data from the second storage location may be responsive to a determination that a data redundancy criterion for the further data has been met.

The moving the further data from the second storage location to a further one of the plurality of storage locations may comprise moving the further data from the second storage location to a storage location of the plurality of storage locations that is geographically nearer to the first storage location than is the second storage location.

The method may comprise, at the first storage location: receiving a or the further request for the further data from a request source; and obtaining the further data stored at the first storage location; and providing, in response to the received further request, the further data to the request source.

The method may comprise: determining whether or not the further data is stored at the first storage location; and the determining the second storage location at which the determined further data is stored may be responsive to a determination that the further data is not stored at the first storage location.

The distributed storage system may be a Unified or Universal Data Repository of a mobile telecommunications network.

According to a second aspect of the present invention, there is provided apparatus configured to provide a first storage location of a distributed storage system of a mobile communications network, the distributed storage system comprising a plurality of said storage locations, each storage location being geographically separated from one another, the apparatus being arranged to perform the method according to the first aspect.

According to a third aspect of the present invention, there is provided a distributed storage system of a mobile communications network, the distributed storage system comprising a plurality of geographically separated storage locations, wherein one or more of the plurality of storage locations are provided by an apparatus according to the second aspect.

According to a fourth aspect of the present invention, there is provided a computer program comprising instructions which when executed on a computer cause the computer to perform the method according to the first aspect.

Further features and advantages of the invention will become apparent from the following description of preferred examples of the invention, given by way of example only, which is made with reference to the accompanying drawings.

DETAILED DESCRIPTION OF CERTAIN INVENTIVE EMBODIMENTS

Figure 1:
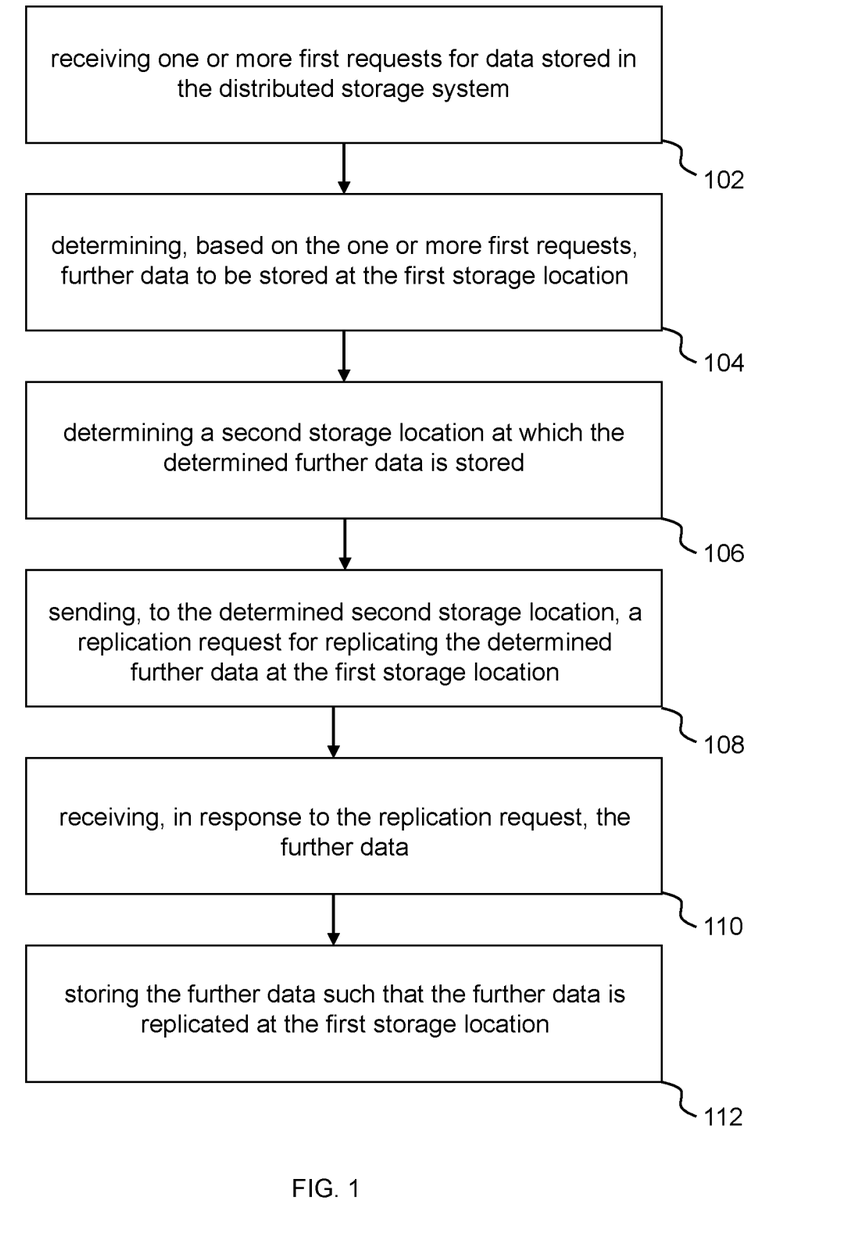
FIG. 1 illustrates schematically a flow diagram of a method of data replication in a distributed storage system of a mobile communications network, according to an example.

Referring to FIG. 1, there is illustrated schematically a flow diagram of a method of data replication in a distributed storage system of a mobile communications network, according to an example.

Figure 2:
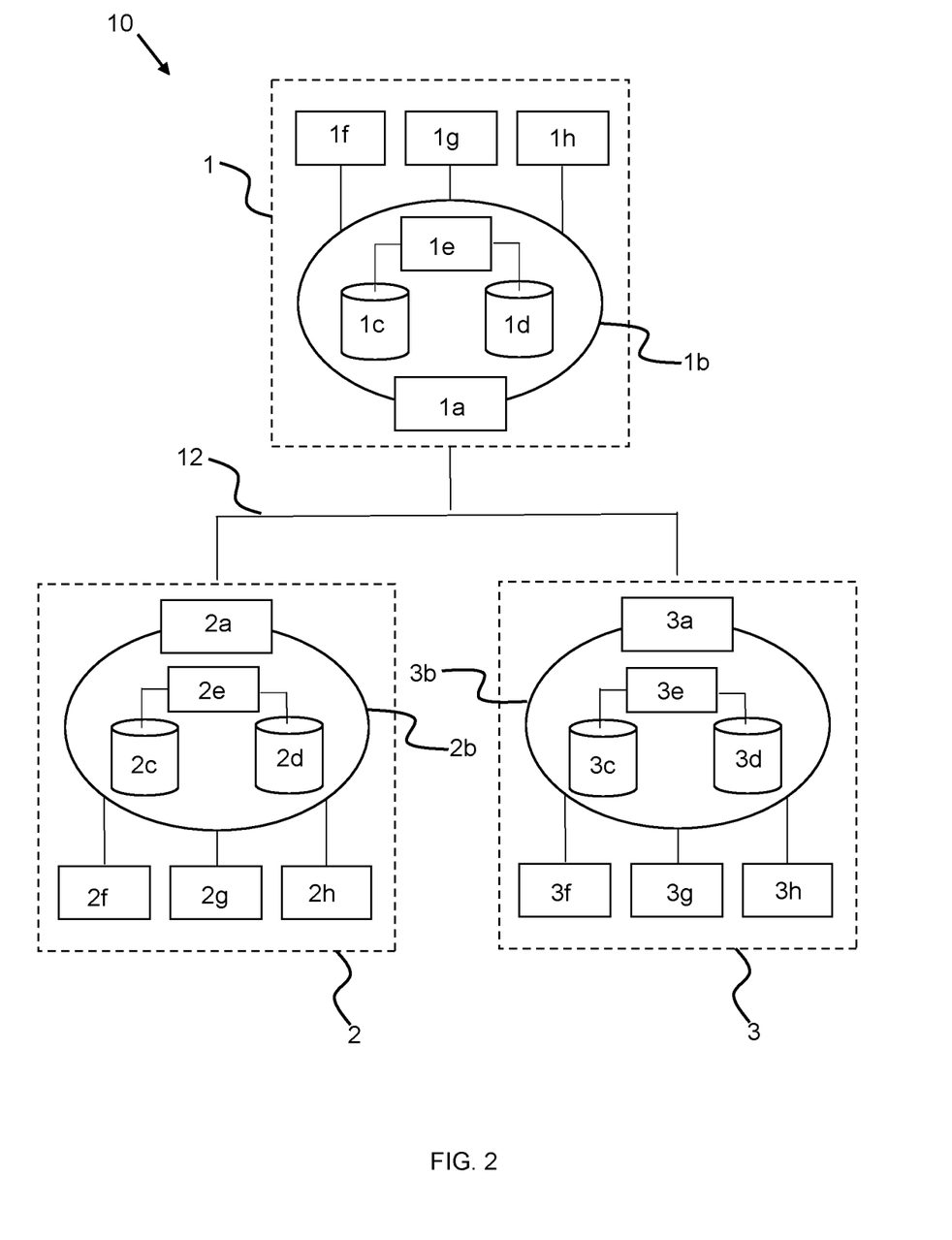
FIG. 2 illustrates schematically a distributed storage system according to an example.

An example distributed storage system 10 is illustrated in FIG. 2. Referring briefly to FIG. 2, the distributed storage system 10 is part of a mobile communications network (not shown in full in FIG. 2 for brevity). For example, the distributed storage system 10 may be implemented in an LTE (Long-term Evolution) or 5G (e.g. 3GPP release 15) network. For example, the mobile communications network (not shown) may have a network architecture as described in 3GPP Technical Specification 23.501 V15.0.0 (2017-12)). The distributed storage system 10 may be or form part of a UDM (Unified Data Management) function and/or a UDR (Unified or Universal Data Repository) of the mobile communications network. For example, the distributed storage system 10 may store and manage subscriber data of subscribers of the mobile communications network, i.e. may provide for Subscriber Data Management (SDM) in the mobile communications network.

The distributed storage system 10 may have, for example, applicability in 5G, for example to provide functionality of one or more UDRs of a 5G mobile communications network. The distributed storage system 10 may have, for example, applicability in Mobile Edge Computing network architectures. For example, the distributed storage system 10 may implemented, for example as a UDR, and/or to provide for SDM, in a Mobile Edge Computing (MEC) communications network. The MEC network may provide for applications or other network functions to be run and/or performed at or towards the edge of the communications network. For example, the MEC may be implemented at base stations of the mobile network. Mobile Edge Computing network architecture may allow for flexible and rapid deployment of services for subscribers of the mobile communications network.

The distributed storage system 10 may allow the applications or other network functions local access to data of the distributed storage system 10, for example local to where the application or other network function is situated, for example local to a base station of the mobile communications network with which a user equipment of a given subscriber is communicating. This may allow for reduced latency in the mobile communications network, for example as compared to centralised storage system where the data may be stored non-local to the network elements, and which may suffer from concentration of traffic. Further, the distributed storage system 10 may allow for applications or other network functions to perform operations more readily at the network edge, for example, without the need to access a core of the network to obtain subscriber information on which those operations may be based. Therefore at least some of the decision making in the mobile communications network may be pushed to the network edge, which may reduce the latency of and/or increase the efficiency of the mobile communications network.

The distributed storage system 10 comprises a plurality of geographically separated storage locations 1b, 2b, 3b (three are shown in FIG. 2) at respective locations 1, 2, 3. Each of the storage locations 1b, 2b, 3b store subscriber data. However, the data stored at a given one of the storage locations 1b, 2b, 3b may be different to the data stored at another or each other ones of the storage locations 1b, 2b, 3b.

Storing different subscriber data at different storage locations 1b, 2b, 3b, as opposed to for example storing exact replicas of all subscriber data at each of the storage locations 1b, 2b, 3b may allow for less storage resources to be used for the distributed storage system 10. Hence the advantages of a distributed storage system to the mobile communications network mentioned above may be achieved with less storage resources and hence, for example, at lower cost. However, since different subscriber data is stored at different storage locations 1b, 2b, 3b, it may be that in some cases the data requested at a given storage location may not be available at that storage location. The methods and apparatus described in more detail below allow for this to be addressed whilst maintaining the advantages associated with distributed storage systems that store different subscriber data at different storage locations.

Continuing to refer to FIG. 2, the storage locations 1b, 2b, 3b are communicatively connected to one another via a data network 12. In this example, each storage location 1b, 2b, 3b comprises an SDM Front-End 1e, 2e, 3e, an SDM Back-End comprising a cluster of database elements 1c, 1d, 2c, 2d, 3c, 3d (two per cluster are shown in FIG. 3) in which the subscriber data is stored, and a Cluster Sync Manager (CSM) 1a, 2a, 3a.

Figure 3:
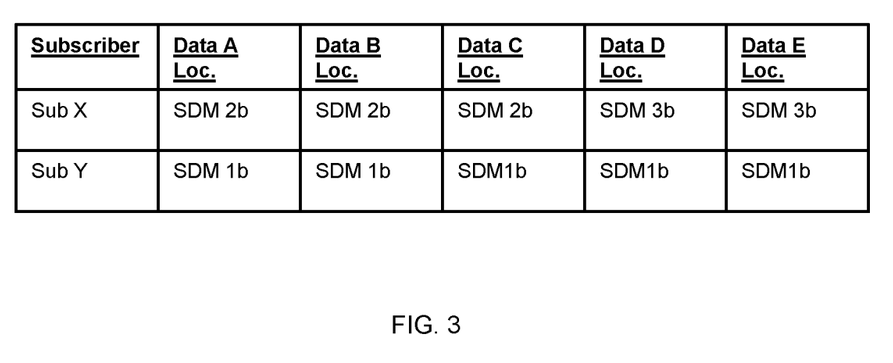
FIG. 3 illustrates schematically a data replication map according to an example.

Each SDM Front-End 1e, 2e, 3e is configured to receive requests for data stored in the distributed storage system 10 from request sources, in this example applications 1f, 1g, 1h, 2f, 2g, 2h, 3f, 3g, 3h (three per location 1, 2, 3 are shown in FIG. 3) for example network elements or functions, of the mobile communications network (not shown). Each SDM Front-End 1e, 2e, 3e may be arranged to implement varying policies, for example authentication and access policies to control how, when and/or what data of the associated database elements 1c, 1d, 2c, 2d, 3c, 3d a request source/application 1f, 1g, 1h, 2f, 2g, 2h, 3f, 3g, 3h may access. Each SDM Front-End 1e, 2e, 3e is communicatively connected to the database elements 1c, 1d, 2c, 2d, 3c, 3d of the SDM Back-end with which it is associated, and is arranged to read and write data to the database elements 1c, 1d, 2c, 2d, 3c, 3d of the SDM Back-end with which it is associated.

As mentioned above, the data stored at a given one of the storage locations 1b, 2b, 3b may be different to the data stored at another or each other ones of the storage locations 1b, 2b, 3b. Each CSM 1a, 2a, 3a stores and manages a data replication map that maps data stored by the distributed storage system 10 to one or more of the plurality of storage locations 1a, 1b, 1c at which the data is stored. Each CSM 1a, 2a, 3a is communicatively connected, via the network 12, to each other of the CSMs 1a, 2a, 3a. The CSMs 1a, 2a, 3a communicate to ensure that the data replication map is consistent among the CSMs 1a, 2a, 3a. Each CSM 1a, 2a, 3a is communicatively connected with the SDM Front-End 1e, 2e, 3e with which it is associated.

An example of a data replication map is illustrated schematically in FIG. 3. In this example, the map is in the form of a table having a "Subscriber" column listing an identifier of different subscribers of the mobile communication network (e.g. "Sub X" and "Sub Y"), a "Data A Loc." column listing at which of the storage locations 1b, 2b, 3b the subscriber data of type "A" for each of the subscribers is located, a "Data B Loc." column listing at which of the storage locations 1b, 2b, 3b the subscriber data of type B each of the subscribers is located, a "Data C Loc." column listing at which of the storage locations 1b, 2b, 3b the subscriber data of type C each of the subscribers is located, a "Data D Loc." column listing at which of the storage locations 1b, 2b, 3b the subscriber data of type D each of the subscribers is located, and a "Data E Loc." column listing at which of the storage locations 1b, 2b, 3b the subscriber data of type E each of the subscribers is located. As can be seen in the example of FIG. 3, the subscriber data of type A, B and C for subscriber "Sub X" are stored at the storage location 2b, and the subscriber data of types D and E for subscriber "Sub X" are stored at the storage location 3b. On the other hand, the subscriber data of types A, B, C, D and E for subscriber "Sub Y" are all stored at the storage location 1b.

Referring again to FIG. 1, the method may be performed at a first storage location 1b, 2b, 3b of the plurality of geographically separated storage locations 1b, 2b, 3b. For brevity of explanation it will be assumed in the following that the method is performed at the storage location 1b.

A broad overview of the method is now presented. The method comprises, in step 102, receiving one or more first requests for data stored in the distributed storage system 10. For example, the first request may be a request from a first application if local to the first storage location 1b, for subscriber data of type A for the subscriber "Sub X".

The method comprises, in step 104, determining, based on the one or more first requests, further data to be stored at the first storage location 1b, the further data being different to the data requested in the one or more first requests. For example, it may be deduced or predicted based on a known or determined access pattern that following receipt of the first request a further request for specific further data will at some point be received at the first storage location 1b, and hence that that further data is to be stored at the first storage location 1b. For example, it may be derived from a predefined access pattern (e.g. deduced by monitoring access requests) that after a first request from the application if for subscriber data of type "A" for the subscriber "Sub X", then will follow at some point a request from the application 1g for subscriber data of type "B" and "C" for the subscriber "sub X" and hence that that data should be stored at the first storage location.

The method comprises, in step 106, determining a second storage location 2b, of the plurality of storage locations 1b, 2b, 3b, at which the determined further data is stored, the second storage location 2b being different to the first storage location 1b. For example, it may be determined that the further data (e.g. data of type "B" and "C" for the subscriber "sub X") is stored in storage location 2b, for example by interrogating the data replication map (see e.g. FIG. 3).

The method comprises, in step 108, sending, to the determined second storage location 2b, a replication request for replicating the determined further data at the first storage location; in step 110 receiving, in response to the replication request, the further data; and in step 112, storing the further data such that the further data is replicated at the first storage location 1b in advance of one or more further requests for the further data being received at the first storage location 1b.

Accordingly, the further data (e.g. type "B" and "C" for the subscriber "sub X") may be replicated at the first storage location 1b before the application 1g requests that data from the first storage location. This pre-emptive action for making available data that is likely to be requested locally, before it is requested, may allow for ready access of the data to local applications, and hence for reduced network latency while still providing the advantages associated with the distributed storage system 10 storing different subscriber data at different storage locations.

Returning in more detail to the method described with reference to FIG. 1, as mentioned above, in step 102, the method comprises receiving, at the first storage location 1b, one or more first requests for data stored in the distributed storage system 10.

For example, a first request may be received by the SDM Front End 1e of the first storage location 1b from one or more of the applications 1f, 1g, 1h of the mobile communications network. For example, the first request may be from application 1f for data of type "A" for the subscriber having subscriber identifier "Sub X". As one example, the application 1f may be an HSS (Home Subscriber Server) of the network that is attempting to authenticate a UE (User Equipment) of the subscriber during an initial registration process for a UE (User Equipment) of a subscriber at the location 1. An example of a first request received at the storage location 1b may therefore be a request from the HSS for authentication data of the UE of the subscriber.

The data requested in the first request may or may not be stored at the storage location 1b that received the first request.

In the case the data requested in the first request is stored at the storage location 1b, the SDM Front-End 1e may retrieve the requested data from one or more of the storage elements 1c, 1d of the first storage location 1b, and provide the requested data to the application 1f.

Figure 4:
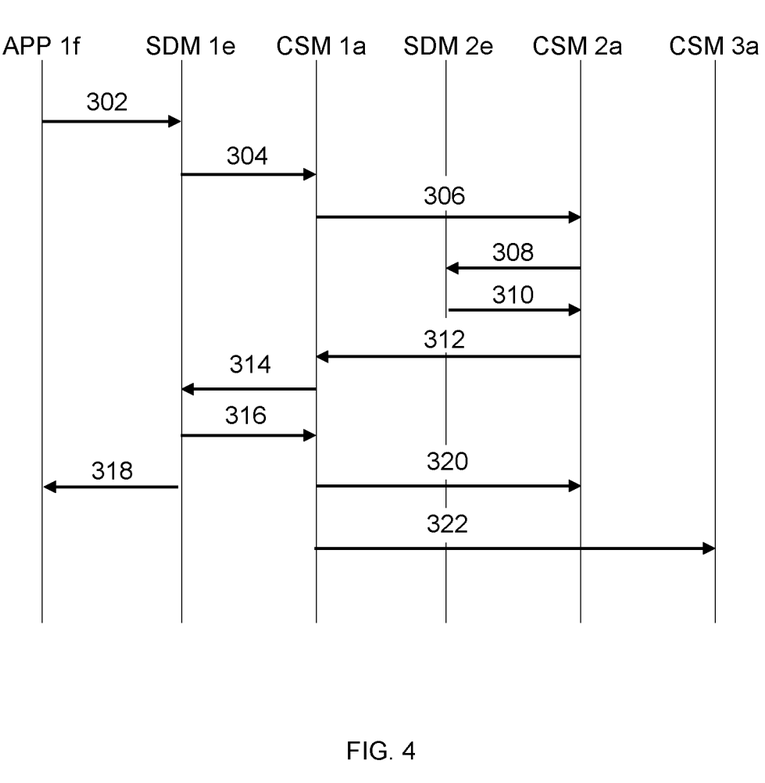
FIG. 4 illustrates schematically a signalling diagram for signalling in the distributed storage system, according to an example.

FIG. 4 illustrates schematically a signalling diagram for the case in which the data requested in the first request is not stored at the storage location 1b, but is instead stored at the geographically separated storage location 2b.

Referring to FIG. 4, as mentioned above, the application 1f, that is local to the first storage location 1b, sends a first request 302 for data stored in the distributed storage system 10 to the first storage location 1b. For example, the first request is for data of type "A" for the subscriber having subscriber identifier "Sub X". The first request 302 is received by the SDM Front-End 1e of the first storage location 1b.

The SDM Front-End 1e may make a determination as to whether or not the data requested in the first request 302 is stored at the first storage location 1b. Responsive to a determination that the data requested in the first request 302 is not stored at the first storage location 2b, or otherwise, the SDM Front End 1e sends a request 304 to the CSM 1a of the first storage location 1b to find the data requested in the first request 302. Responsive to receipt of this request 304, the CSM 1a interrogates the data replication map stored therein (see e.g. the example data replication map of FIG. 3) to determine a second storage location 2b at which the requested first data is stored. For example, the CSM 1a may determine from the data replication map of FIG. 3 that the requested data of type "A" for the subscriber having subscriber identifier "Sub X" is stored at storage location 2b.

The CSM 1a then sends to the determined second storage location 2b (specifically to the CSM 2a of the second storage location 2b), a replication request 306 for replicating the data requested in the first request 302 at the first storage location 1b.

On receipt of the replication request 306, the CSM 2a of the second storage location 2b sends a read request 308 to the SDM Front-End 2e of the second storage location 2b for the data requested in the first request 302. The SDM 2e acquires the requested data from one or more of the storage elements 2c, 2d, and sends a response 310 containing the acquired data to the CSM 2a.

On receipt of the response 310 from the SDM Front-End 2e, the CSM 2a of the second storage location 2b sends the acquired data to the CSM 1a of the first storage location 1b in a response 312 to the replication request 306. The CSM 1a of the first storage location 1b passes 314 the acquired data to the SDM Front-End 1e, which stores the acquired data in one or more of the storage element 1c, 1d associated therewith, such that the acquired data is replicated at the first location 1b. The SDM Front End 1e sends an acknowledgement 316 to the CSM 1a to acknowledge that the acquired data has been replicated at the first storage location 1b.

Responsive to the acknowledgement 316, the CSM 1a updates the data replication map stored therein to indicate that the data requested in the first request is replicated at the first storage location 1b. The CSM 1a sends replication updates 320, 322 to the CSMs 2a, 3a of the other of the plurality of storage locations 2b, 3b, and the CSMs 2a, 3a update the replication maps stored locally therein so as to indicate that the data requested in the first request is replicated at the first storage location 1b.

The SDM Front end 1e of the first storage location 1b provides the acquired data (which is the data requested in the first request 302) to the application 1f, in response to the first request 302. The application 1f may then use this data, for example to authenticate a UE of the subscriber during a registration process at the location 1.

Hence the distributed storage system 10 may allow for the above described advantages of storing different subscriber data at different storage locations, but also allow for a local data request to be answered even in the case that the subscriber data is not stored locally to the request source. Further, in this case, the requested data is replicated to the storage location at which the first request was received, and hence will be locally available for further such local requests, which may be likelier than such requests at any one of the other storage locations. In other words, the requested data is replicated and hence available at the geographical point or location of interest (i.e. where the subscriber is located geographically on the communications network), which may allow for ready access of relevant network functions to that data, as well as allowing for effective storing of the subscriber data.

Referring again to FIG. 1, as mentioned above, in step 104, the method comprises determining, based on the one or more first requests, further data to be stored at the first storage location 1b, the further data being different to the data requested in the one or more first requests.

In some examples, determining the further data to be stored at the first storage location 1b may comprises identifying a predefined access pattern with which the one or more first requests is associated, and determining the further data to be stored at the first storage location 1b based on the identified predefined access pattern.

For example, one or more predefined access patterns may be stored in or otherwise accessible to the SDM Front-End 1e (and/or the SDM Front-End of each of the storage locations 1b, 2b, 3b).

The one or more predefined access patterns may each comprise information related to one or more further requests for data stored in the distributed storage system 10 to be received by the first storage location 1b. For example, the predefined access pattern may include information that following receipt of the first request a further request for specific further data will at some point be received. The information may comprise information identifying one or more applications 1e, 1f, 1g that are to send the one or more further requests for data stored in the distributed storage system to the first storage location.

Figure 5:
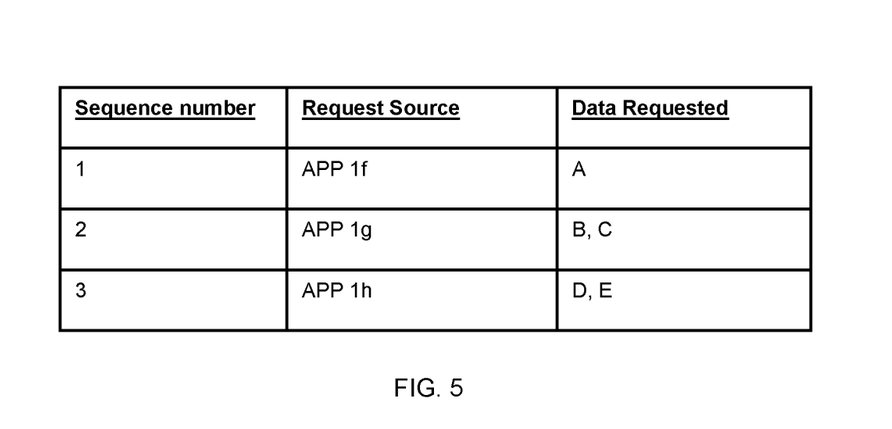
FIG. 5 illustrates schematically a predefined access pattern according to an example.

FIG. 5 illustrates schematically a predefined access control pattern according to an example. In this example, the predefined access control pattern is represented as a table. A first column of the table lists a "Sequence number" defining the position within an ordered sequence in which the requests are received at the first storage location 1b. A second column lists the "Request Source" from which a given request is received, and a third Column lists "Data Requested" which gives the data type requested or other information identifying the data requested in the corresponding request. According to the example predefined access control pattern of FIG. 5, the first request in the pattern is one from application 1f and is a request for data of type "A", the second request in the pattern is one from application 1g and is a request for data of types "B" and "C", and the third request in the pattern is one from application 1h and is a request for data of types "D", and "E".

As a specific example of an access pattern, in a subscriber initiated attach procedure in an LTE network, for example, the subscriber's UE at location 1 may signal, via an eNode B, to an MME at location 1.

First, the MME may signal to the HSS (Home Subscriber Server) of the subscriber's UE, to authenticate the UE. The HSS may send a first request to the distributed storage system 10, specifically to the SDM Front-End 1e of the first storage location 1b, for authentication data of the subscriber, in order to be able to authenticate the UE. This may be the first request listed in the predefined access pattern, i.e. the first request of the access pattern may be from a HSS 1f for authentication data "A" of the UE of the given subscriber.

Having authenticated the UE, the MME may then attempt to decide the appropriate S-GW (Signalling Gateway) to send signalling traffic to so as to obtain an IP address for the UE of the given subscriber, and hence may therefore send a second request to the distributed storage system 10, specifically to the SDM Front-End 1e of the first storage location 1b, for home location data of the subscriber. The second request in the predefined access pattern may therefore be from the MME or AMF 1g for home location data "B" and "C" of the UE of the given subscriber.

As a result of obtaining the home location data "B" and "C", the MME or AMF 1g may decide to send the signalling traffic to the appropriate S-GW. The S-GW may then signal to a P-GW (Packet Gateway), which may then signal to a PCRF to obtain an IP address for the UE. The PCRF may send a third request to the distributed storage system 10, specifically to the SDM Front-End 1e of the first storage location 1b, for IP address data of the subscriber's UE, in order to be able to provide the IP address associated with the UE to the P-GW and hence the S-GW. The third request in the predefined access pattern may therefore be from the PCRF 1h for IP address data "D" and "E" of the UE of the given subscriber. Having the IP address data, the S-GW can then obtain downlink data from the PDN (Packet Data Network), and the attach procedure may continue as appropriate.

The above access sequence or pattern may occur every time a subscriber initiated attach procedure is performed on the mobile communications network. Hence for example, the UDR Front-End 1e of the first storage location may be arranged such that when a first request of the sequence is received (e.g. when a request from a HSS 1f for authentication data "A" of the UE of a given subscriber is received), then the UDR Front-End 1e not only ensures the data requested in that first request is present at the first storage location 1b (e.g. by sending a replication request to the location at which it is stored), but also that the further data that will soon be requested in other requests in that sequence (e.g. the home location data "B" and "C" of the UE of the given subscriber and the IP address data "D" and "E" of the UE of the given subscriber) is present at the first storage location 1b (e.g. by sending a replication request to the location at which it is stored), in advance of those other requests being received. This reduces network latency for network operations associated with the further data.

It will be appreciated that many such access patterns may exist.

In some examples, the predefined access pattern may be statically provisionsed, for example provisioned into storage of one or more of the UDR Front-Ends based 1e, 2e, 3e, based on a pre-existing knowledge of signalling patterns in a mobile telecommunications network during various procedures, for example the subscriber initiated attach procedure in an LTE network described above.

In some examples, the distributed storage system 10, for example one or more of the storage locations 1b, 2b, 3b, for example one or more of the UDR Front-Ends 1a, 2a, 3a of the storage locations 1b, 2b, 3b, may determine (i.e. actively determine) predefined access patterns. For example, one or more predefined access patterns may be determined using machine learning techniques implemented in the distributed storage system 10.

In some examples, determining a predefined access pattern may comprise monitoring requests received at one of the plurality of storage locations 1b, 2b, 3b, applying a pattern recognition process to the monitored requests to identify a pattern in the monitored requests, and determining the predefined access pattern based on the identified pattern. For example, an access pattern may be identified when a given sequence of the monitored requests is received at one of the plurality of storage locations 1b, 2b, 3c more than a predefined number of times. For example, a given sequence of requests may comprise successive requests received at a given storage location 1b, 2b, 3b, each request of the sequence associated with the same (i.e. a common) distinguished entry of the distributed storage system, for example each associated with the same subscriber of the mobile communications network. For example, if the sequence of requests illustrated in FIG. 5 is received at one or a number of storage locations 1b, 2b, 3b more than a predefined number of times (e.g. 100 times) this sequence may be identified as an access pattern that is likely to occur again, and hence may be determined as a predefined access pattern. This predefined access pattern may then be used as described above to determine further data to be stored at a given storage location when a first request in the predefined access pattern is received.

In some examples, identifying a given sequence of monitored requests as an access pattern may be based on a frequency with which the given sequence occurs. For example, identifying a given sequence of the monitored requests as an access pattern may comprise determining that the given sequence of requests is received at one of the plurality of storage locations more than the predefined number of times within a predefined time period. For example, if the sequence of requests illustrated in FIG. 5 is received at one or a number of storage locations 1b, 2b, 3b more than a predefined number of times (e.g. 100 times) within a predefined time period (e.g. 1 hour), this sequence may be identified as an access pattern that is being used frequently and hence is likely to occur again, and hence may be determined as a predefined access pattern.

In some examples, a predefined access pattern determined at any one of the storage locations 1b, 2b, 3b may be shared, for example via network 12, to one or more or each other of the storage locations 1b, 2b, 3b. This may allow for predefined access patterns to be established relatively quickly across the distributed storage network 10.

Returning to FIG. 1, as mentioned above, in some examples, determining the further data to be stored at the first storage location 1b based on the first request may comprise identifying a predefined access pattern with which the one or more first requests are associated, and determining the further data to be stored at the first storage location 1b based on the identified predefined access pattern.

In some examples, identifying a predefined access pattern with which the first request is associated may comprise identifying a predefined access pattern that includes the first request. For example, the identified predefined access pattern may comprise a sequence of requests, the sequence of requests comprising the first requests (or one or more first requests) followed by one or more further requests for further data that are to be received by the first storage location. The further data to be stored at the first storage location 1b may then be determined from the type of data requested in the further requests of the sequence. For example, the predefined access pattern illustrated in FIG. 5 may be identified if the first request received at the storage location 1b is a request from the application 1f data "A" of a given subscriber (which is the first request in the predefined access pattern of FIG. 5). Based on this identification, the further data to be stored at the first storage location 1b may determined as the data "B", "C", "D", and "E" for the given subscriber, as it is known from the predefined access pattern of FIG. 5 that this data will soon we requested at the first storage location 1b by applications 1g and 1h respectively.

In some examples, identifying the predefined access pattern with which the first request (or one or more first requests) are associated may comprise determining one or more characteristics of the first request, and identifying the predefined access pattern associated with the first request on the basis of the determined one or more characteristics of the first request. For example, the one or more characteristics may comprise the request source (e.g. the application or other network function) from which the first request is received. For example, if a first storage location 1b determines that the request is received from application 1f (e.g. a HSS), the first storage location may identify the predefined access pattern of FIG. 5 as an appropriate predefined access pattern, and may determine the further data to be stored at the first storage location based on this predefined access pattern as described above. Alternatively or additionally, the one or more characteristics may comprise the set of data that is requested in the first requests. For example, if a first storage location 1b determines that the first request is a request for data "A" for a given subscriber, the first storage location 1b may identify the predefined access pattern of FIG. 5 as an appropriate predefined access pattern, and may determine the further data to be stored at the first storage location based on this predefined access pattern as described above. The one or more characteristics may comprise an entry of the distributed storage system to which one or more of the first request relates, for example the identity of the subscriber to which the first request relates. For example, if a first storage location 1b determines that the first request is a request for data of a given subscriber, the first storage location may determine the further data to be stored at the first storage location as other data for that given subscriber.

In some examples, there may be a plurality of predefined access patterns, for example stored at each SDM Front end 1e, 2e, 3e, and the method and identifying the predefined access pattern with which the first request is associated may comprise selecting the predefined access pattern with which the first request is associated from the plurality of predefined access patterns, for example as described above.

Returning again to FIG. 1, after the further data to be stored at the first storage location 1b has been determined, the first storage location 1b, for example the SDM Front End 1e of the first storage location, may determine whether or not the further data is stored at the first storage location. In some cases, the further data may already be stored at the first storage location 1b, in which case no further action may be taken. However, in other cases, it may be determined that the further data is not stored at the first storage location and that the further data will be obtained from another of the plurality of storage locations 1b, 2b, 3b.

The method comprises, in step 106, determining a second storage location 2b, of the plurality of storage locations 1b, 2b, 3b, at which the determined further data is stored, the second storage location 2b being different to the first storage location 2b. As mentioned above, in some examples, this determination may be responsive to a determination that the further data is not stored at the first storage location 1b.

The determining the second storage 2b at which the further data is stored may be performed, for example by the CSM 1a of the first storage location 1b, in the same or similar way as described above with reference to FIG. 4 for the data requested in the first request 302. For example, the method may comprise interrogating the data replication map that maps data stored by the distributed storage system 10 to one or more of the plurality of storage locations 1b, 2b, 3b at which the data is stored. For example, the data replication map may be the same or similar to that described above with reference to FIG. 3. For example, the CSM 1a of the first storage location may determine from the data replication map of FIG. 3 that the further data "B", "C" for subscriber "Sub X" is stored at storage location 2b, and hence the CSM 1a may determine the storage location 2b as a second storage location at which the further data is stored.

The method comprises, in step 108, sending, to the determined second storage location 2b, a replication request for replicating the determined further data at the first storage location 1b. Sending the replication request may be performed, for example by the CSM 1a of the first storage location 1b, in the same or similar way as described above for the replication request 306 of FIG. 4 for the data requested in the first request 302. For example, the CSM 1a may send a replication request for the further data to the CSM 2a of the second storage location 2b. On receipt of the replication request, the CSM 2a of the second storage location 2b may send a read request to the SDM Front-End 2e of the second storage location 2b for the further data. The SDM 2e may then acquires the further data from one or more of the storage elements 2c, 2d, and send a response containing the acquired data to the CSM 2a.

The method comprises, in step 110, receiving, in response to the replication request, the further data. For example, as described above, the further data may be received by the CSM 1a of the first storage location 1b from the CSM 2a of the second storage location 2b.

The method comprises, in step 112, storing, at the first storage location 1b, the further data such that the further data is replicated at the first storage location 1b in advance of one or more further requests for the further data being received at the first storage location 1b. For example, the storing of the first data at the first storage location may be the same or similar to the storing of the data requested in the first request described above with reference to FIG. 4. For example, the CSM 1a of the first storage location 1b, having received the further data in the response to the replication request, may pass the acquired data to the SDM Front-End 1e, which may store the acquired data in one or more of the storage element 1c, 1d associated therewith, such that the acquired data (further data) is replicated at the first location 1b.

The further data may therefore be stored at the first storage location 1b in advance of one or more further requests for the further data being received at the first storage location 1b, and hence the further data may be readily available when those further requests are received at the first storage location 1b. This may allow for the latency of the communications network to be reduced, whilst still maintaining the reduction of storage resources allowed for by not necessarily maintaining an exact replica of all of the data of the distrusted storage system at each storage location.

In some examples, the SDM Front End 1e may send an acknowledgement to the CSM 1a to acknowledge that the acquired further data has been replicated at the first storage location 1b.

In some examples, the method may comprise, responsive to the storing of the further data at the first storage location 1b, updating the data replication map such that the updated data replication map maps the further data to the first storage location 1b. For example, responsive to the acknowledgement that the acquired further data has been replicated at the first storage location 1b, the CSM 1a may update the data replication map stored therein to indicate that the further data is replicated at the first storage location 1b. In some examples, the CSM 1a sends replication updates to the CSMs 2a, 3a of the other of the plurality of storage locations 2b, 3b, and the CSMs 2a, 3a update the replication maps stored locally therein so as to indicate that the further data is replicated at the first storage location 1b. Hence the data replication maps may be consistent amongst each of the storage locations 1b, 2b, 3b.

In some examples, the method may comprise receiving a or the further request for the further data from a request source at the first storage location 1b, obtaining the further data stored at the first storage location 1b; and providing, in response to the received further request, the further data to the request source. For example, the SDM Front end 1e of the first storage location 1b may receive, at some point after the first request from the application 1f for the data "A" of subscriber "Sub X" is received, a request from the application 1g for the data "B", and "C" of subscriber "Sub X". Since this further data has already been replicated at the first storage location 1b (e.g. by the method above described with reference to FIG. 1), the SMM Front-End 1e may immediately obtain the further data from one or more of the storage elements 1c, 1d associated therewith, and provide the further data to the application 1g that requested the further data.

In some examples, the further data may be replicated at the first storage location 1b such that the further data is stored at both the first storage 1b and the second storage location 2b from which the further data was obtained. This may be advantageous in order to maintain suitable redundancy of the further data in the distributed storage system 10. However, in some examples, the method may comprise removing the further data from the second storage location 2b, or moving the further data from the second storage location 2b to a further one of the plurality of storage locations 2b.

For example, removing the further data from the second storage location 2b may be responsive to a determination that a data redundancy criterion for the further data has been met. For example, there may be a redundancy policy that a replica of a given set of data must be present at a predetermined number of storage locations 1b, 2b, 3b, for example must be maintained at least two or three or N (positive integer) of the plurality of storage locations 1b, 2b, 3b. The number of storage locations at which a given set of data is currently maintained may be determined by interrogating the data replication map. For example, the data redundancy criterion may be that a replica of any given set of data must be maintained at least two of the plurality of storage locations 1b, 1c, 2d. In this case, if it is determined that by replicating the further data at the first storage location, the further data is now stored at all three of the first storage location 1b, the second storage location 2b, and the third storage location 3b, then replica of the further data at the second storage location 2b (or the third storage location 3b) may be removed. This may allow for demand on storage resources to be reduced. The data redundancy policy may alternatively or additionally be based on data availability considerations, for example be based on a consideration of the storage locations 1b, 2b, 3b to which any given storage location 1b, 2b, 3b is communicatively connected, for example so as to ensure data may be replicated when required, even in the event of disconnect of a given number of the storage locations 1b, 2b, 3b.

As another example, moving the further data from the second storage location 2b to a further one of the plurality of storage locations 1b, 3b may comprise moving the further data from the second storage location 2b to a storage location of the plurality of storage locations 3b that is geographically nearer to the first storage location 1b than is the second storage location 2b. For example, it may be that a subscriber is currently at location 1, and that location 3 is relatively near to, for example adjacent to, location 1, but that location 2 is relatively far from location 1. Hence, when the further data is replicated from storage location 2b to storage location 1b, it may be decided that rather than keep the replica at storage location 2b, the replica at storage location 2b is moved instead to storage location 3b. This may be advantageous because it may be that the subscriber that is currently at location 1 is more likely to next be in location 3 (that is adjacent to location 1) than they are to be in location 2. Hence it may be more likely that a request for the further data (or data requested in the first request) will next be received at the storage location 3b than it is to be received at the storage location 2b. Hence moving the data replica for that subscriber to the geographically closer storage location 3b may help to reduce the latency of the network, as requests for the data to the storage location 3b may then be readily served.

As mentioned above, the distributed storage system 10 may be or form part of a Unified Data Management (UDM) function and/or a Unified or Universal Data Repository (UDR) of a mobile telecommunications network, such as an LTE network or a 5G network, for example.

Figure 6:
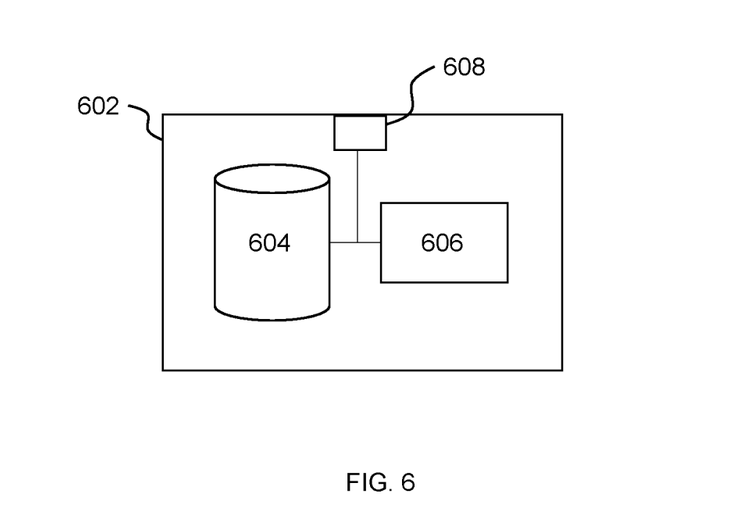
FIG. 6 illustrates schematically an apparatus for providing a first storage location of a distributed storage system of a mobile communications network, according to an example.

Referring to FIG. 6, there is illustrated schematically an example apparatus 602 configured to provide one of the storage locations 1b, 2b, 3b of the plurality of storage locations 1b, 2b, 3b described above. The apparatus 602 comprises an input/output port 608, a processor 606 and a memory 604. The input/output port 608 may be, for example, connectable to the mobile communications network in order to receive and respond to requests from request sources, and/or may be connectable to the network 12 so as to allow communication with other storage locations as described above. The processor 606 may be arranged, in conjunction with the memory 604 and the input/output port 608, to perform the method of the examples described above with reference to FIGS. 1 to 5. For example, the apparatus 602 may be arranged to implement any of the functionality of the first storage location 1b described above, for example any of the functionality of the SDM Front-End 1e and/or the CSM 1a and/or the storage elements 1c, 1d of the first storage location 1b described above with reference to FIGS. 1 to 5. For example, the memory 604 may store one or more of the subscriber data, the data replication map, the predefined access patterns. The memory 604 may alternatively or additionally store a computer program comprising instructions which when executed on by the processor 606 of the apparatus 602 cause the apparatus 602 to perform the method or provide the functionality of the examples described above with reference to FIGS. 1 to 5.

The above examples, are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method of data replication in a distributed storage system of a mobile communications network, the distributed storage system comprising a plurality of geographically separated storage locations, the method comprising, at a first storage location of the plurality of geographically separated storage locations:

receiving one or more first requests for data stored in the distributed storage system;

determining, based on the one or more first requests, predicted data to be stored at the first storage location, the predicted data being different to and predicted from the data requested in the one or more first requests;

determining a second storage location, of the plurality of storage locations, at which the determined predicted data is stored, the second storage location being different to the first storage location;

sending, to the determined second storage location, a replication request for replicating the determined predicted data at the first storage location;

receiving, in response to the replication request, the predicted data; and storing the predicted data such that the predicted data is replicated at the first storage location in advance of one or more further requests for the predicted data being received at the first storage location; wherein the determining the predicted data to be stored at the first storage location comprises:

identifying a predefined access pattern with which the one or more first requests are associated; and determining the predicted data to be stored at the first storage location based on the identified predefined access pattern.

2. The method according to claim 1, wherein the identifying the predefined access pattern with which the one or more first requests are associated comprises:

determining one or more characteristics of the one or more of the first requests; and identifying the predefined access pattern on the basis of the determined one or more characteristics of the one or more first requests.

3. The method according to claim 2, wherein the one or more characteristics comprise one or more request sources from which one or more of the first requests is received; and/or one or more sets of data that are requested in one or more of the first requests; and/or one or more entries of the distributed storage system to which one or more of the first request relates.

4. The method according to claim 1, wherein the identifying the predefined access pattern with which the one or more first requests are associated comprises:

selecting the predefined access pattern with which the one or more first requests are associated from a plurality of said predefined access patterns.

5. The method according to claim 1, wherein the identified predefined access pattern comprises information related to the one or more further requests for data stored in the distributed storage system to be received by the first storage location, and the predicted data to be stored at the first storage location is determined based on the information related to the one or more further requests.

6. The method according to claim 5, wherein the information related to the one or more further request comprises information identifying one or more applications that are to send the one or more further requests for data stored in the distributed storage system to the first storage location.

7. The method according to claim 1, wherein the method comprises:

determining the predefined access pattern;

wherein the determining the predefined access pattern comprises:

monitoring requests received at one of the plurality of storage locations;

applying a pattern recognition process to the monitored requests, thereby to identify a pattern in the monitored requests; and determining the predefined access pattern based on the identified pattern.

8. The method according to claim 7 wherein the pattern recognition process comprises:

determining that a given sequence of the monitored requests is received at one of the plurality of storage locations more than a predefined number of times.

9. The method according to claim 8, wherein the pattern recognition process comprises:

determining that the given sequence of the monitored requests is received at one of the plurality of storage locations more than the predefined number of times within a predefined time period.

10. The method according to claim 8, wherein the requests of the given sequence of requests are each associated with the same distinguished entry of the distributed storage system; wherein the distinguished entry is an entry for a given subscriber of the mobile communications network.

11. The method according to claim 1, wherein the data requested in one or more of the first requests, and the predicted data to be stored at the first storage location, are from the same distinguished entry of the distributed storage system.

12. The method according to claim 1, wherein the method comprises:

interrogating a data replication map, the data replication map mapping data stored by the distributed storage system to one or more of the plurality of storage locations at which the data is stored; and wherein the determining the second storage location at which the determined predicted data is stored is based on the interrogating.

13. The method according to claim 12, wherein the method comprises:

responsive to the storing of the predicted data at the first storage location such that the predicted data is replicated at the first storage location, updating the data replication map such that the updated data replication map maps the predicted data to the first storage location.

14. The method according to claim 1, wherein the method comprises:

removing the predicted data from the second storage location; or moving the predicted data from the second storage location to a further one of the plurality of storage locations.

15. The method according to claim 14, wherein the removing the predicted data from the second storage location is responsive to a determination that a data redundancy criterion for the predicted data has been met; or wherein the moving the predicted data from the second storage location to a further one of the plurality of storage locations comprises moving the predicted data from the second storage location to a storage location of the plurality of storage locations that is geographically nearer to the first storage location than is the second storage location.

16. The method according to claim 1, wherein the method comprises, at the first storage location:

receiving a further request for the predicted data from a request source; and obtaining the predicted data stored at the first storage location; and providing, in response to the received further request, the predicted data to the request source; or wherein the method comprises:

determining whether or not the predicted data is stored at the first storage location; and wherein the determining the second storage location at which the determined predicted data is stored is responsive to a determination that the predicted data is not stored at the first storage location; or wherein the distributed storage system is a Unified or Universal Data Repository of a mobile telecommunications network.

17. Apparatus comprising a processor and memory at a first storage location of a distributed storage system of a mobile communications network, the distributed storage system comprising a plurality of said storage locations, each storage location being geographically separated from one another, the apparatus being arranged to perform a method of, at the apparatus arranged to:

receive one or more first requests for data stored in the distributed storage system;

determine, based on the one or more first requests, predicted data to be stored at the first storage location, the predicted data being different to and predicted from the data requested in the one or more first requests;

determine a second storage location, of the plurality of storage locations, at which the determined predicted data is stored, the second storage location being different to the first storage location;

send, to the determined second storage location, a replication request for replicating the determined predicted data at the first storage location;

receive, in response to the replication request, the predicted data; and store the predicted data such that the predicted data is replicated at the first storage location in advance of one or more further requests for the predicted data being received at the first storage location;

wherein the determination of the predicted data to be stored at the first storage location comprises:

identifying a predefined access pattern with which the one or more first requests are associated; and determining the predicted data to be stored at the first storage location based on the identified predefined access pattern.

18. A non-transitory computer readable medium storing instructions which when executed on a computer cause the computer to perform a method of data replication in a distributed storage system of a mobile communications network, the distributed storage system comprising a plurality of geographically separated storage locations, the method comprising, at a first storage location of the plurality of geographically separated storage locations:

receiving one or more first requests for data stored in the distributed storage system;

determining, based on the one or more first requests, predicted data to be stored at the first storage location, the predicted data being different to and predicted from the data requested in the one or more first requests;

determining a second storage location, of the plurality of storage locations, at which the determined predicted data is stored, the second storage location being different to the first storage location;

sending, to the determined second storage location, a replication request for replicating the determined predicted data at the first storage location;

receiving, in response to the replication request, the predicted data; and storing the predicted data such that the predicted data is replicated at the first storage location in advance of one or more further requests for the predicted data being received at the first storage location;
wherein the determining the predicted data to be stored at the first storage location comprises:
identifying a predefined access pattern with which the one or more first requests are associated; and
determining the predicted data to be stored at the first storage location based on the identified predefined access pattern.

\* \* \* \* \*